United States Patent [19]

Fischer et al.

[11] Patent Number: 5,687,005

[45] Date of Patent: Nov. 11, 1997

[54] METHOD OF OPTIMIZING THE REPRODUCTION OF A PICTURE COPY THROUGH MINIMIZATION OF ELEMENTARY HALFTONE CELL OVERLAP

[75] Inventors: Gerhard Fischer, Sinsheim; Marcel Kiessling, Schriesheim; Wolfgang Pfizenmaier, Neckargemünd, all of Germany

[73] Assignee: Heidelberger Druckamschinen AG, Heidelberg, Germany

[21] Appl. No.: 338,906

[22] Filed: Nov. 14, 1994

[30] Foreign Application Priority Data

Nov. 18, 1993 [DE] Germany .......................... 43 39 281.4

[51] Int. Cl.$^6$ ..................................................... H04N 1/52
[52] U.S. Cl. ........................................... 358/456; 358/459
[58] Field of Search ............................... 358/298, 459, 358/536, 296, 455, 456; 382/252

[56] References Cited

U.S. PATENT DOCUMENTS

| | | |
|---|---|---|
| 4,084,183 | 4/1978 | Keller et al. |
| 4,149,183 | 4/1979 | Pellar et al. ........................... 358/459 |
| 4,680,645 | 7/1987 | Dispoto et al. ........................ 358/298 |
| 5,087,981 | 2/1992 | Ng et al. ................................ 358/459 |
| 5,124,803 | 6/1992 | Troxel .................................... 358/459 |
| 5,305,118 | 4/1994 | Schiller et al. ........................ 358/456 |
| 5,448,366 | 9/1995 | Hamilton, Jr. ........................ 358/536 |
| 5,469,267 | 11/1995 | Wang ................................... 358/298 |
| 5,526,140 | 6/1996 | Rozzi ................................... 358/535 |

OTHER PUBLICATIONS

"Electroconically Generated Halftone Pictures", Klensch et al., RCA Review, Sep. 1970, pp. 564–572.

"Electronic halftones", Hallows et al., IEEE Spectrum, Oct. 1968, pp. 64–72.

*Primary Examiner*—Stuart N. Hecker
*Assistant Examiner*—Derek J. Jardieu
*Attorney, Agent, or Firm*—Herbert L. Lerner; Laurence A. Greenberg

[57] ABSTRACT

Method of optimizing a reproduction of a picture copy includes scanning a picture copy optoelectrically for generating scanning signals, in accordance with the scanning signals, electronically screening the picture copy and inscribing a recording medium so that one of a plurality of screen fields on the recording medium corresponds to one or more scanning signals of the picture copy, forming each of the screen fields, respectively, of a plurality of elementary cells, and determining relative locations of the elementary cells so that a region of overlap between an inscribed and an adjacent non-inscribed elementary cell, respectively, is minimal.

13 Claims, 5 Drawing Sheets

METHOD OF OPTIMIZING THE REPRODUCTION OF A PICTURE COPY THROUGH MINIMIZATION OF ELEMENTARY HALFTONE CELL OVERLAP

The invention relates to a method of optimizing the reproduction of a picture copy.

Screening methods are employed for simulating the most diverse densities of a picture copy (halftones) by printing technology. This type of simulation is possible because the human eye, due to its limited capacity for resolution, integrates the screen structures into a halftone beyond a given screen count or ruling (number of print elements per unit of length equals lines per centimeter).

Conventional reproduction photography is being replaced increasingly by electronic screening methods. Whereas, conventionally, conversions of genuine halftones of the picture copy into non-genuine halftones of the printed image is attained with the aid of a contact or spacer screen, in electronic screening, density relationships of the screens are simulated and used for image formation.

In electronic screening, the picture copy is scanned by a scanning device, such as a drum or flat-bed scanner. The scanning signals of the scanner furnish information regarding the determined density value of the respective screen field. Because differences in density or discontinuities in tone within the screen field are no longer taken into account, the dimensioning of the screen fields must be adapted or matched, from the very outset, to the high quality requirements of the printed products.

The scanning signals are further processed electronically. A limited number of density stages is available for reproducing the most varied density values. The quality or efficiency of information transfer is determined essentially by the differences in density between the individual stages.

On a recording medium, i.e., a printing form, one screen dot, which is composed of a number of individual surface elements (elementary cells), corresponds to a scanning signal of the picture copy, that signal encompassing at least one screen field. By way of example, the measured density value can be simulated by the ratio between unwritten or unrecorded and written or recorded elementary cells. Writing, i.e., inscribing or recording, on the individual elementary cells is performed in a conventional manner by means of illuminating spots or points of a laser.

German Published, Non-Examined Patent Disclosure DE-OS 20 12 728 has disclosed heretofore a method for recording screened half-tone pictures. A screened surface having a given number of dot units forms the basis for the production or generation of the screen dots (in this case, coverage spots). Film material wrapped around or mounted on a writing drum is inscribed either with a single laser beam or with a plurality of individually triggerable optical waveguides located side by side. The screen dots are composed of a variable number of recording lines. The size of the coverage spots corresponds to the respective tonal values of the scanned values on a tonal value scale. The form per se of the screen dots is freely programmable; round, square, rhomboid and elliptical forms may be used. This screening method accordingly presumes that the screen dot spacing is constant, and the tonal value of a region of the printed copy is simulated by the varying size of the screen dots. In the technical literature, this method is known as the amplitude modulation method.

In addition to this amplitude modulation method, a frequency modulation method has also become known heretofore. In this regard, the varying density values which are measured in the individual screen fields of the picture copy are simulated by a suitably adapted or matching local accumulation of recording dots of approximately like size.

One method for recording electronically screened pictures with a predetermined area covering program for the tonal values has been disclosed heretofore in published German Patent Document DE 29 34 436 C2. In particular, in the method described in that German patent document, the area covering program is changed whenever specific sharp corners or angles and/or thin lines or gaps between adjacent screen dots appear, which could lead to undesirable smears or tears; the new area covering having a like tonal value, respectively, as the previous tonal value. In particular, this method seeks to avoid establishing the transition, upon the occurrence of smears, i.e., contact between or partial mutual covering of freely disposed screen dots, so that only slight discontinuities in tonal values are effected.

It is accordingly an object of the invention of the instant application to provide a method of optimizing the reproduction of a picture copy which minimizes smearing which causes a joining of the dots so that the recording is more uniformly weighted.

With the foregoing and other objects in view, there is provided, in accordance with the invention, a method of optimizing a reproduction of a picture copy, which comprises scanning a picture copy optoelectrically for generating scanning signals; in accordance with the scanning signals, electronically screening the picture copy and inscribing a recording medium so that one of a plurality of screen fields on the recording medium corresponds to one or more scanning signals of the picture copy; forming each of the screen fields, respectively, of a plurality of elementary cells; and determining relative locations of the elementary cells so that a region of overlap between an inscribed and an adjacent non-inscribed elementary cell, respectively, is minimal.

In accordance with another mode of the invention, the method includes forming the screen fields with arbitrary shapes.

In accordance with a further mode of the invention, the method includes forming the elementary cells with arbitrary shapes.

In accordance with an added mode of the invention, the method includes mutually offsetting the screen fields orthogonally.

In accordance with an additional mode of the invention, the method includes mutually offsetting the elementary cells orthogonally.

In accordance with respective alternative modes of the invention, the method includes mutually offsetting the screen fields and/or the elementary cells in a manner other than orthogonally.

In accordance with yet another mode of the invention, the method includes describing the respective elementary cells by recording lines and a recording dot.

In accordance with yet a further mode of the invention, the method includes selecting the offset of the elementary cells so that the number of recording lines and the number of recording dots, respectively, is different in the recording direction from those in a direction orthogonal to the recording direction.

In accordance with yet an added mode of the invention, the method includes selecting the recording direction in accordance with the number of recording lines and the number of recording dots so that the recording speed is optimized.

In accordance with yet an additional mode of the method according to the invention, the scanning of the picture copy is performed in a manner that the scanning dots cover the picture copy, and respective regions of overlap of adjacent scanning dots is minimal.

In accordance with another mode of the invention, the method includes offsetting the scanning dots from one another purposefully by triggering the scanning device.

In accordance with a concomitant mode of the invention, the method includes attaining the offset of the scanning dots by reading out and processing the respective scanning signals at varying times.

Thus, the object of the invention is attained by scanning the picture copy or original optoelectrically. Next, based upon the scanning signals, electronic screening of the picture copy and inscription of or writing on a recording medium is performed in a manner that one screen field on the recording medium corresponds to one or more scanning signals of the picture copy, and each screen field comprises a plurality of elementary cells. As a final step of the method, the relative location of the elementary cells is determined so that the region of overlap between a written and an adjacent unwritten elementary cell is minimal.

In advantageous further features of the method of the invention, provision is made for both the screen fields of the picture copy and the elementary cells of a respective screen field to have an arbitrary shape on the recording medium. One usual shape is represented by a circular surface which, particularly with a rapid rotation of the writing or recording cylinder, undergoes an elliptical deformation. Advantageously, on the one hand, the shape of the elementary cells can be selected so that a further minimization of the region of overlap and hence optimization with respect to a uniform weighting of the picture recording are attained.

Besides an orthogonal offset of the screen fields and/or the elementary cells, a further advantageous feature of the method of the invention provides for the offset to be non-orthogonal, for example, rhomboidal. In particular, the type of offset is selected so that a minimization of the regions of overlap between the screen fields and between the written and unwritten elementary cells, respectively, is attained.

In an advantageous mode of the method of the invention, a proposal is offered that the offset of the elementary cells be selected so that the number of recording lines and the number of recording dots, respectively, namely, variables which characterize the individual elementary cells, is different in the recording direction from those in a direction orthogonal to the recording direction. It becomes possible thereby to achieve a switchover with respect to the fineness of recording, by changing the direction of recording.

An especially advantageous further mode of the method according to the invention provides that the recording direction be selected in accordance or as a function of the number of recording lines and the number of recording dots so that the recording speed is optimized. This mode can be considered to be especially advantageous if a printing form in the printing press itself is written on or inscribed and then off-printed. In such a case, to minimize the downtimes during inscription of the printing plates, it has proven to be extremely favorable to employ an asymmetrical screen offset.

The following advantageous additional modes of the method according to the invention are related to the scanning of the picture copy or original. As described hereinbefore, the original or picture copy is also scanned in individual screen fields (scanning dots). These screen fields, which are typically also circular or elliptical surfaces, are intended to encompass the entire original or picture copy; to optimize the scanning speed, nevertheless, the region of overlap between adjacent screen fields should be kept minimal. It is therefore proposed that, also in this case, the screen fields in the individual lines be offset from one another orthogonally or at a specific angle from one another. An offset between the screen fields is attained either by suitably triggering or controlling the scanner, that is, the scanning head, or by reading out the corresponding signals at staggered or offset instants of time, the difference in time being equivalent to a spatial offset of the screen.

Other features which are considered as characteristic for the invention are set forth in the appended claims.

Although the invention is illustrated and described herein as a method of optimizing the reproduction of a picture copy, it is nevertheless not intended to be limited to the details shown, since various modifications and changes may be made therein without departing from the spirit of the invention and within the scope and range of equivalents of the claims.

The construction of a device for performing the method, as well as the method of operation of the invention, however, together with additional objects and advantages thereof will be best understood from the following description of specific modes or embodiments when read in connection with the accompanying drawings, in which.

Figure 1:
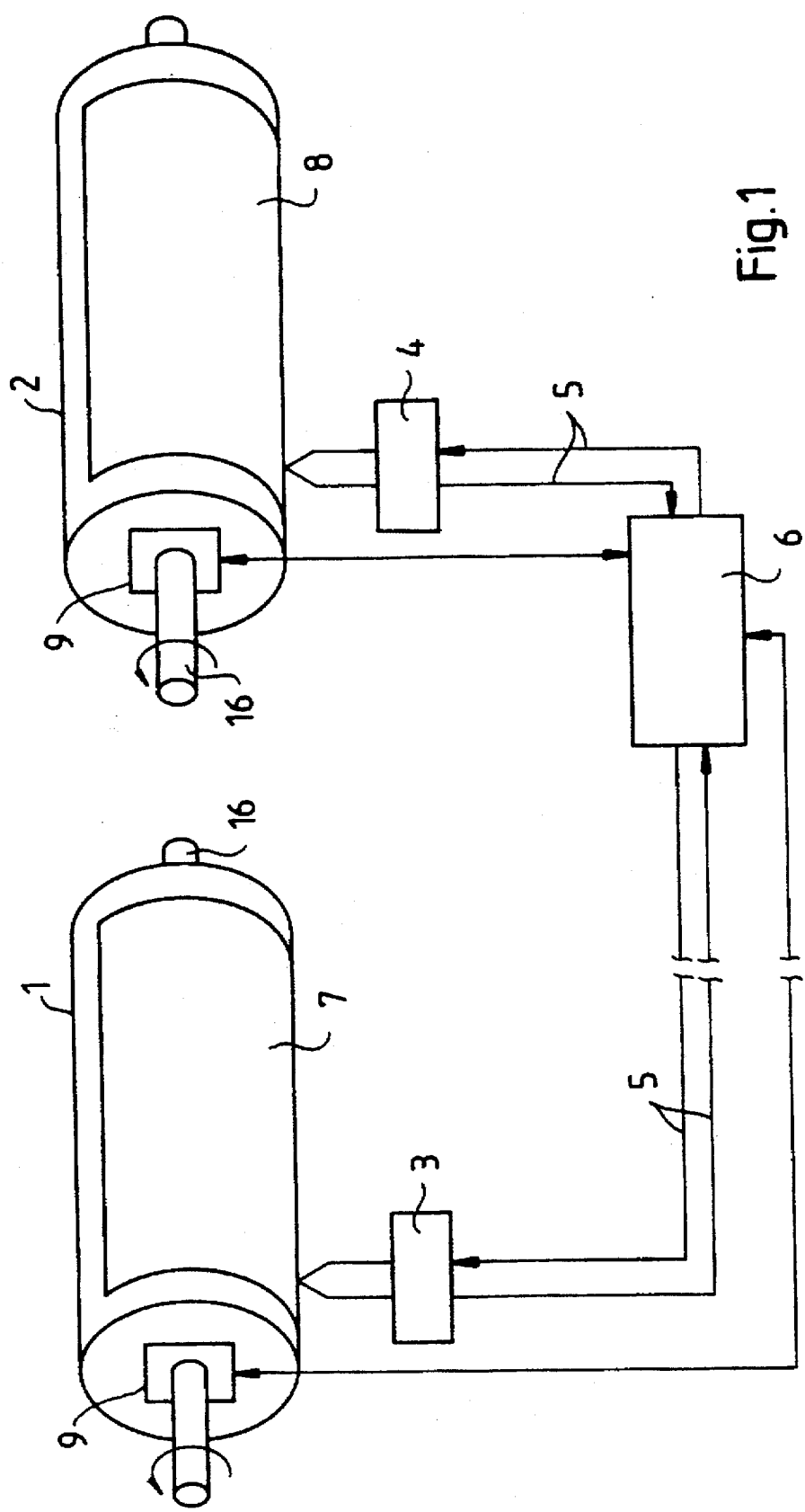
FIG. 1 is a diagrammatic and schematic view of a device for performing the method according to the invention.

Referring now to the drawing and, first, particularly to FIG. 1 thereof, there is shown therein a device for performing the method according to the invention. Motors, not otherwise shown in the drawing, drive a scanning cylinder 1 and a writing cylinder 2. A picture copy 7, which serves as an original from which printed copies are made, is clamped to the scanning cylinder 1. The picture copy 7 is scanned by means of a scanning device 3 which is formed of at least one scanner head.

Figure 4:
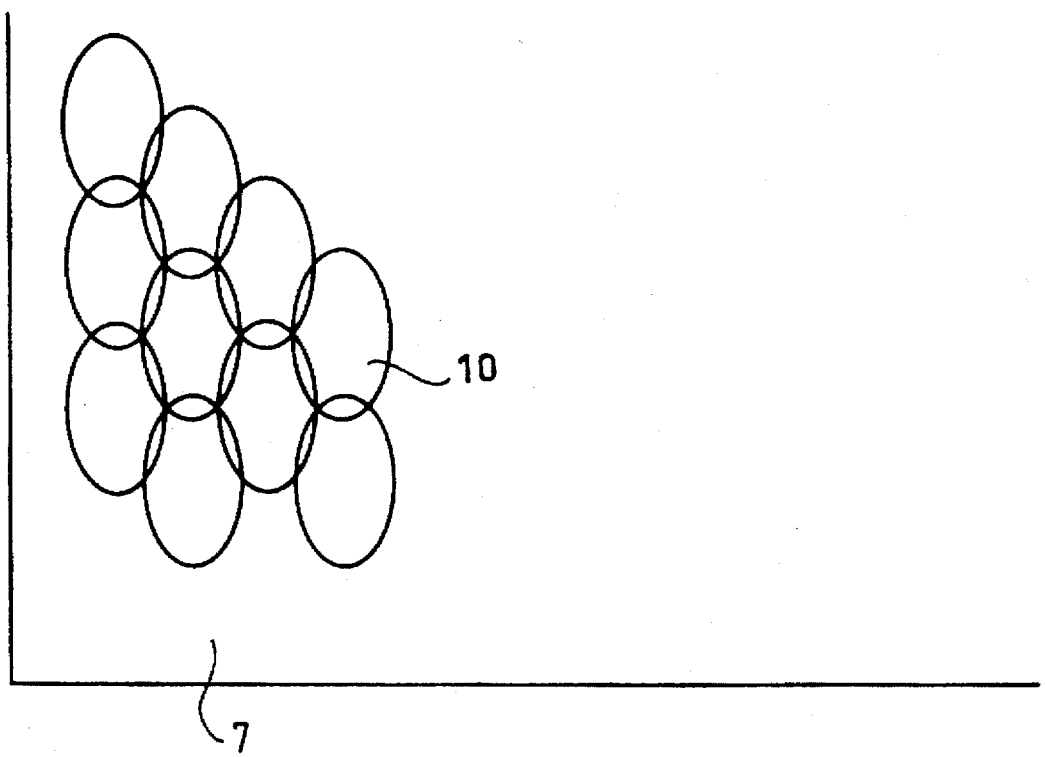
FIG. 4 is a view of an optimized scanning screen for a picture copy.

The picture copy 7 is broken down into individual screen fields (scanning dots) by subdividing the picture copy 7 into lines, each of the lines, in turn, being subdivided into regions of like size extending in the circumferential direction of the scanning cylinder 1. Technically, the division of the picture copy 7 into lines is realized by suitably advancing the scanner head 3 during the course of rotation or after each revolution of the scanning cylinder 1. The subdivision of each line into the individual screen fields is effected by a circumferential cycling or synchronization, wherein an integral multiple of the respective cycles must always correspond to the circumference of the scanning cylinder 1. The amount of advancement of the scanner head 3 in the axial direction and the cycling in the circumferential direction are generally different, so that the shape of the screen fields is rectangular. If continuous scanning of the picture copy 7 is performed during one revolution of the scanning cylinder 1 (spiral scanning), rhomboidal screen fields are obtained. A further shape of the screen field is shown in FIG. 4.

The scanning signals of the various screen fields are transmitted to a computing and control device 6 via connecting lines 5. The computing and control device 6 also receives the signals from a rotary angle encoder 9, which is disposed on the shaft of the scanning cylinder 1. If necessary, another angle encoder 9 is provided on the shaft of the writing cylinder 2. Two rotary angle encoders 9 are always necessary whenever the two cylinders 1 and 2 are not both disposed on the same shaft. This is the case, for example, if a printing form is inscribed or written directly onto a plate cylinder of a printing press. A method and an embodiment of a printing form enabling a direct inscription of the printing plate in a printing press have become known heretofore from U.S. Pat. No. 4,958,563.

Figure 3:
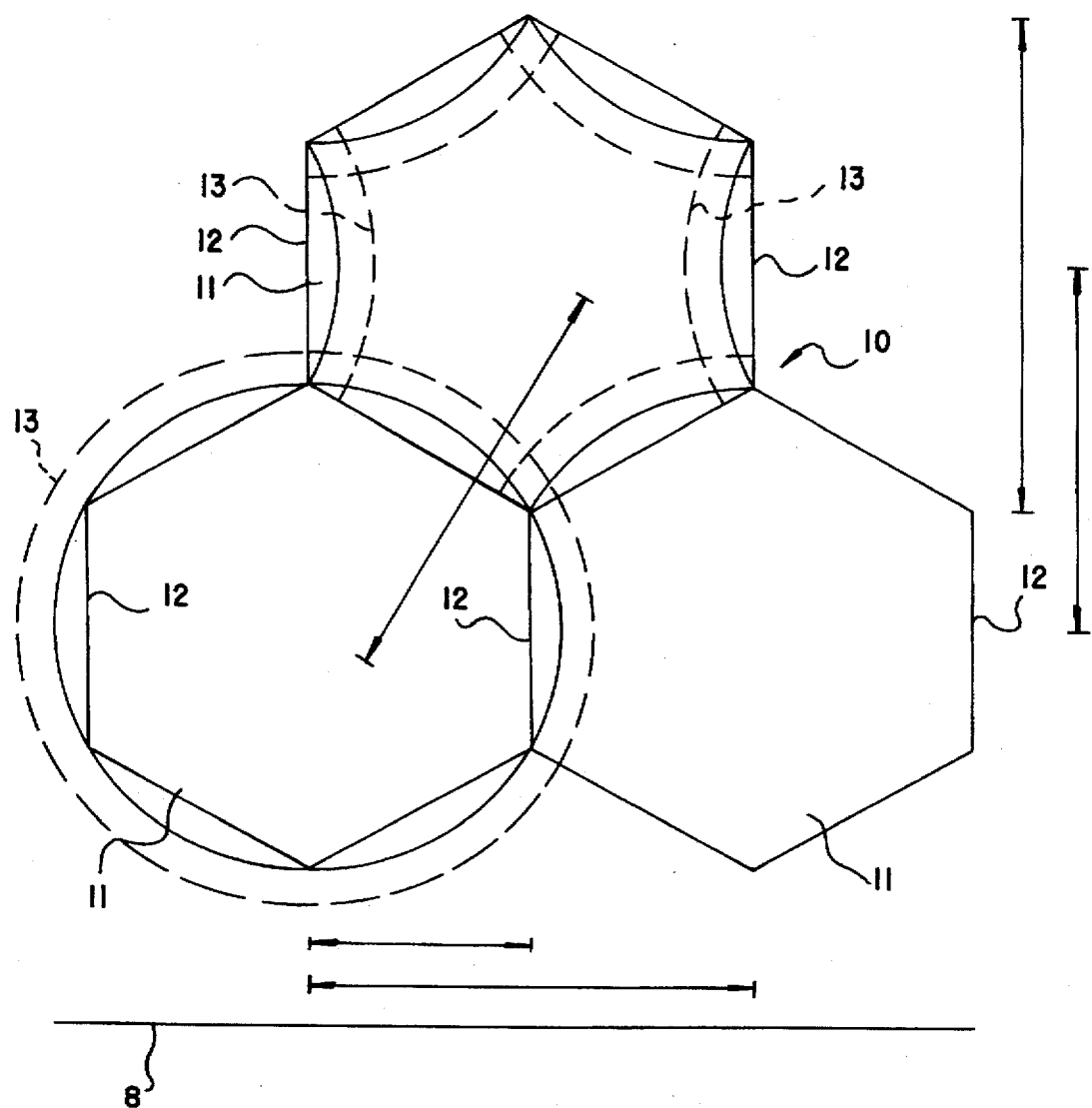
FIG. 3 is a view of a recording screen suitable for performing the method according to the invention.

In the computing and control device 6, the scanning signals of the scanner head 3 are converted into inscription data for various screen fields 10 (one of which is shown in FIG. 3, for example) on a recording medium 8. In the case at hand, the recording medium 8 is mounted directly on the writing cylinder 2.

Figure 2:
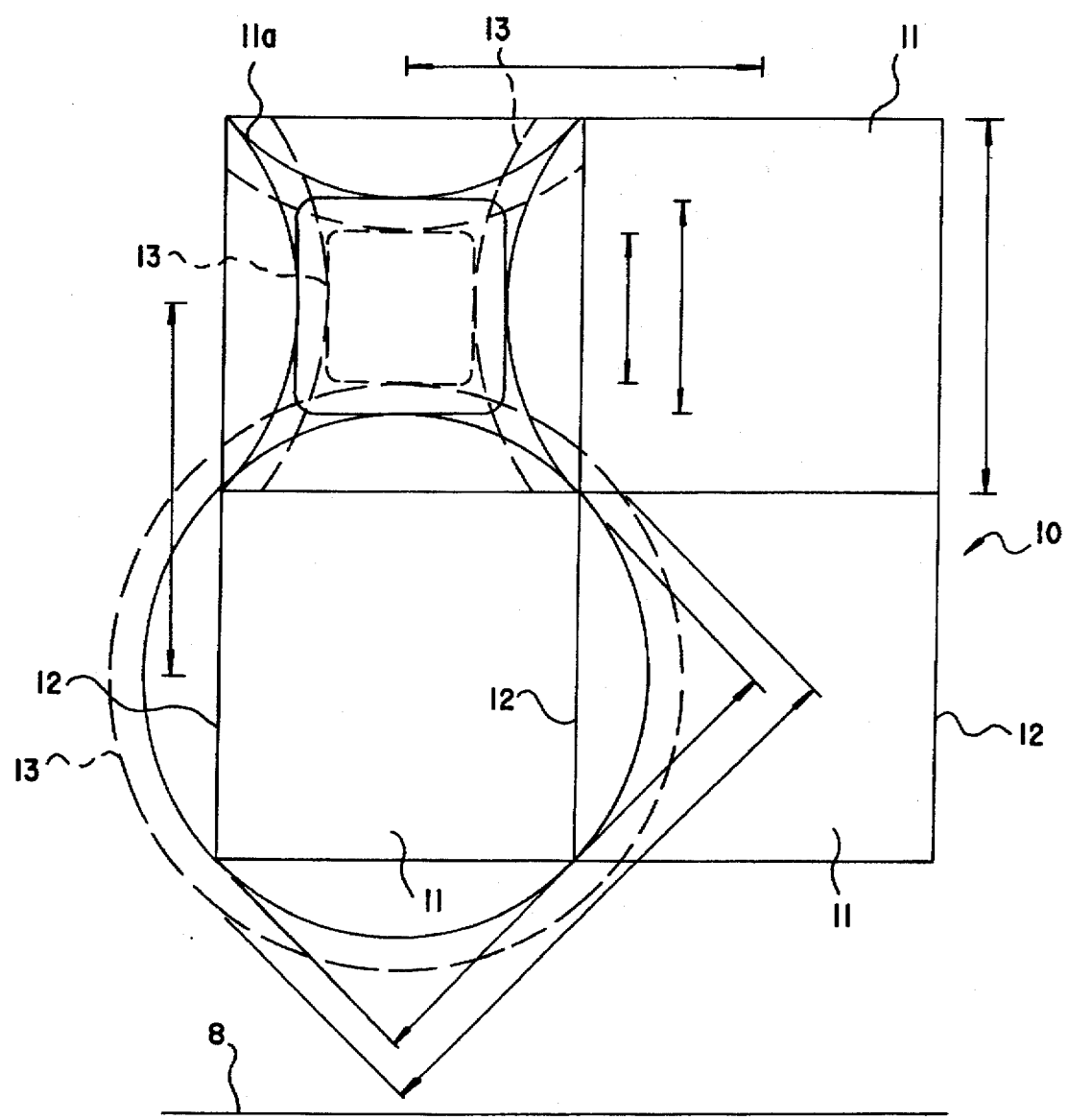
FIG. 2 is a diagrammatic view of a recording screen according to the prior state of the art.

FIG. 2 shows a recording screen of the type used in the prior art. This screen is a so-called orthogonal screen, wherein the various elementary cells 11 in one screen field 10 are not offset from one another. In the illustrated embodiment, the elementary cell 11a is supposed to be an unwritten elementary cell 11, while the elementary cells 11 adjoining the latter cell 11, only two of which are seen in FIG. 2, are written. A laser beam produces spots or points of light, i.e., typically circular areas, in the individual elementary cells.

To attain a complete inscription of one of the elementary cells 11 which is to be inscribed or written on, the circular area must have the radius of the circle circumscribing the elementary cells 11.

The light spot of the recording head 4 (laser) is defined by a solid circular line. Depending upon the film material used and upon other parameters, a given tolerance must be provided, so that the circular area actually written by the light spot is bounded by a broken line. The elementary cell 11a, which actually was supposed to be unwritten, is accordingly partly covered by the light spots of the adjacent elementary cells 11. Finally, only a small region of the elementary cell 11a remains unlighted. Because of the increase in tonal value in the printing process, the unwritten part of the surface of the elementary cell 11a continues to shrink or diminish. The coverage factor defined as the ratio of the unwritten area to the written area, is therefore relatively low in an intrinsically unwritten elementary cell 11a.

Considerably better results are obtained if, besides using an especially produced form of the elementary cell 11, the various elementary cells 11 are displaced relative to one another. This displacement may be either orthogonal or rhomboidal in appearance, for example. An advantageous embodiment of a screen which clearly illustrates the method according to the invention is shown in FIG. 3. The various elementary cells 11 of the screen field 10 are hexagonal area elements. In the illustrated embodiment, the offset of the recording lines 12 and the offset of the recording dots differ, the screen offset being thus asymmetrical.

Due to the hexagonal shape of the elementary cells 11, a considerably better approximation to the circular area of a recording dot 13 of the writing head 4 is attained. As in the case described hereinbefore with regard to FIG. 2, once again the minimum radius of the recording dot 13 is equivalent to that of the circle around the center of mass or volume of the elementary cell 11. The broken line again embodies the actual size of the recording dot 13. Because of the special shape of the various elementary cells 11 and the offset of the elementary cells 11 from one another, the coverage factor is considerably higher than in the prior art.

Because of the asymmetrical screening of the elementary cells 11, the screen offset of the recording lines 12 being different from the screen offset of the recording dots 13, a switch-over or change-over effect occurs by reversing the directions of recording.

FIG. 4 illustrates an example of how optimization with a view to minimizing overlap among the various screen fields 10 is attained by means of a purposeful offsetting of the screen fields when a picture copy 7 is scanned. Because of a high scanning speed resulting from a rotation of the scanning cylinder 1, the originally circular scanning dots 14, which are respectively detected by the scanner head 3, are deformed elliptically. Other shapes are possible. The offset of the scanning dots 14 in the circumferential and lateral directions is selected so that the extent or degree of overlap between the various scanning dots 14 becomes minimal. The so-called scanner moiré thereby automatically becomes minimal as well.

Figure 5:
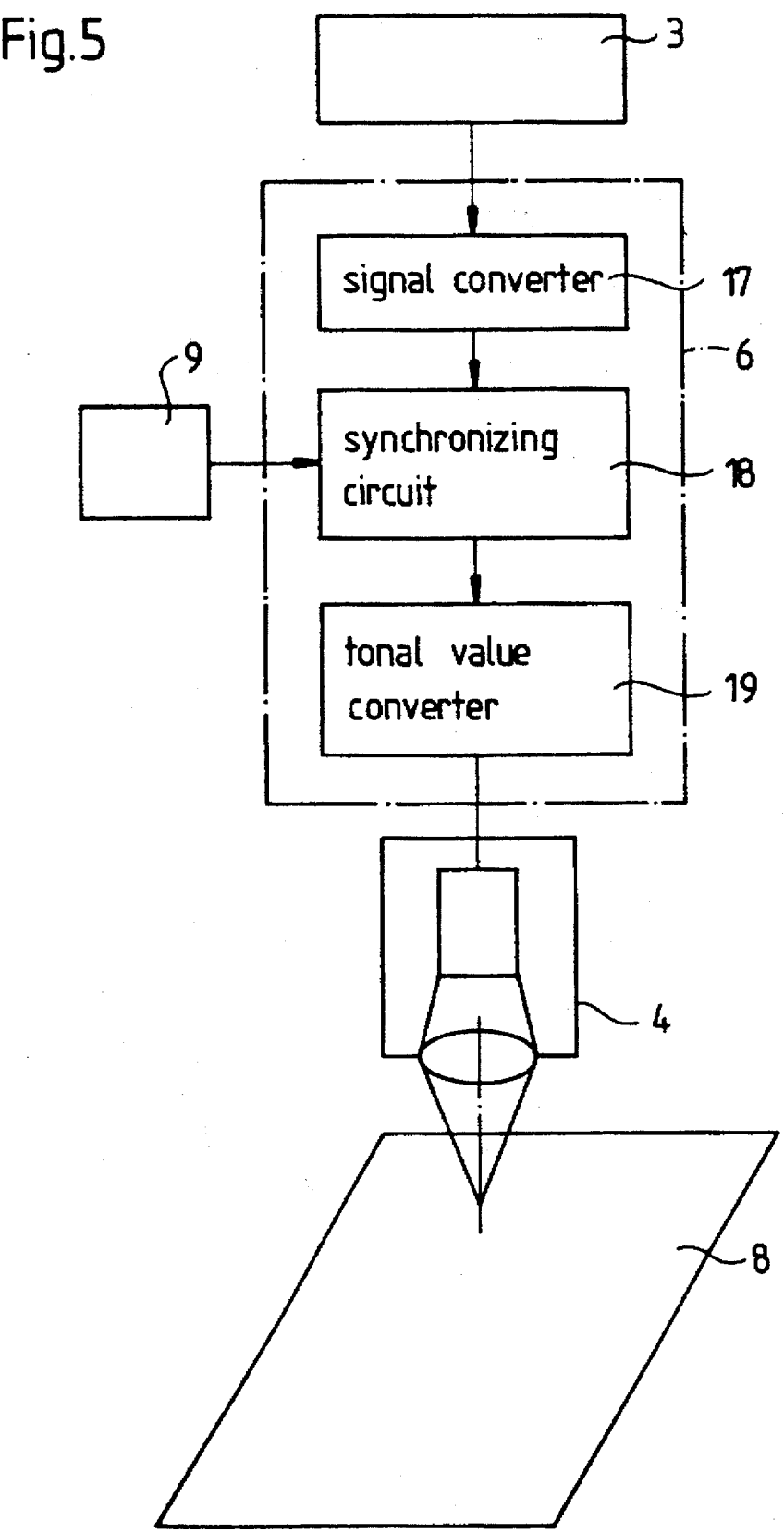
FIG. 5 is a block diagram showing, in a flow-diagram form, the operation of the device of FIG. 1 for performing the method according to the invention.

In the combined block diagram and flow chart of FIG. 5, the operation of the computer and control device 6 is more fully explained.

If the signals at the output of the scanner head 3 should lie, for example, within the range of 30 to 200 mV (millivolts), digital tonal value signals within the range of 0 to 255 would then be formed therefrom at an output of a signal converter 17 of the device 6. A signal at a level of 50 mV at the output of the scanner head 3 can produce a digital tonal value of 16, for example.

By means of a synchronizer or synchronizing circuit 18 of the device 6 to which the output signals of the signal converter 17 and of the rotary angle encoder 9 have been fed, a local coordination or correlation of the picture dots of the picture copy 7 to the picture dots of the recording medium 8 is effected. If the picture copy 7 and the recording medium 8 have different formats or sizes, the synchronizer 18 additionally effects a suitable enlargement and reduction, respectively.

A tonal value converter 19 of the device 6 produces a lighting pattern for each scanning spot or point (pixel). In accordance therewith, the tonal value converter 19 generates signals by which the writing head 4 is controlled.

We claim:

1. Method of optimizing a reproduction of a picture copy, which comprises scanning a picture copy optoelectrically for generating scanning signals; in accordance with the scanning signals, electronically screening the picture copy and inscribing a recording medium so that one of a plurality of screen fields on the recording medium corresponds to one or more scanning signals of the picture copy; forming each of the screen fields, respectively, of a plurality of elementary cells; and determining relative locations and shapes of the elementary cells so that a region of overlap between an inscribed and an adjacent non-inscribed elementary cell, respectively, is minimal.

2. Method according to claim 1, which includes forming the screen fields with arbitrary shapes.

3. Method according to claim 2, which includes mutually offsetting the screen fields orthogonally.

4. Method according to claim 2, which includes mutually offsetting the screen fields in a manner other than orthogonally.

5. Method according to claim 1, which includes forming the elementary cells with arbitrary shapes including hexagonal shapes.

6. Method according to claim 5, which includes mutually offsetting the elementary cells orthogonally.

7. Method according to claim 5, which includes mutually offsetting the elementary cells in a manner other than orthogonally.

8. Method according to claim 1, which includes describing the respective elementary cells by recording lines and a recording dot.

9. Method according to claim 8, which includes selecting the offset of the elementary cells so that the number of recording lines and the number of recording dots, respectively, is different in the recording direction from those in a direction orthogonal to the recording direction.

10. Method according to claim 9, which includes selecting the recording direction in accordance with the number of recording lines and the number of recording dots so that the recording speed is optimized.

11. Method according to claim 1, wherein the scanning of the picture copy is performed in a manner that the scanning dots cover the picture copy, and respective regions of overlap of adjacent scanning dots is minimal.

12. Method according to claim 11, which includes offsetting the scanning dots from one another by maneuvering the scanning device.

13. Method according to claim 11, which includes attaining the offset of the scanning dots by reading out and processing the respective scanning signals at varying lines.

* * * * *